(12) United States Patent
Heerman et al.

(10) Patent No.: US 6,531,679 B2
(45) Date of Patent: Mar. 11, 2003

(54) METHOD FOR THE LASER MACHINING OF ORGANIC MATERIALS

(75) Inventors: Marcel Heerman, Merelbeke (BE); Eddy Roelants, Brügge (BE); Hubert De Steur, Drongen (BE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/965,207

(22) Filed: Sep. 27, 2001

(65) Prior Publication Data

US 2002/0060209 A1 May 23, 2002

(30) Foreign Application Priority Data

Sep. 29, 2000 (DE) .......................................... 100 48 480

(51) Int. Cl.$^7$ ............................................... B23K 26/38
(52) U.S. Cl. .............................. 219/121.72; 219/121.69
(58) Field of Search ....................... 219/121.72, 121.67, 219/121.68, 121.69–121.7, 121.71, 121.61

(56) References Cited

U.S. PATENT DOCUMENTS

| | | | | | |
|---|---|---|---|---|---|
| 4,274,062 A | * | 6/1981 | Brinkmann et al. | .......... | 372/53 |
| 5,611,902 A | * | 3/1997 | Leader et al. | ................ | 204/431 |
| 5,990,444 A | * | 11/1999 | Costin | .................... | 219/121.69 |
| 6,008,467 A | * | 12/1999 | Tsunetomo et al. | .... | 219/121.69 |
| 6,022,905 A | * | 2/2000 | Harris et al. | .................... | 522/2 |
| 6,075,223 A | * | 6/2000 | Harrison | ................ | 219/121.85 |
| 6,118,096 A | * | 9/2000 | Feng et al. | ............ | 219/121.69 |
| 6,168,853 B1 | * | 1/2001 | Feng et al. | .................. | 428/207 |
| 6,291,797 B1 | * | 9/2001 | Koyama et al. | ........ | 219/121.73 |
| 6,379,325 B1 | * | 4/2002 | Benett et al. | .................. | 604/22 |
| 6,417,486 B1 | * | 7/2002 | Reil et al. | .............. | 219/121.69 |

* cited by examiner

Primary Examiner—Tom Dunn
Assistant Examiner—Jonathan Johnson
(74) Attorney, Agent, or Firm—Laurence A. Greenberg; Werner H. Stemer; Ralph E. Locher

(57) ABSTRACT

For the laser machining of organic materials, a laser with the below listed parameters is used. The laser has a wavelength of 300 nm to 1200 nm, a pulse width of <50 ns and a pulse frequency of >20 kHz. To increase a degree of absorption and consequently the machining rate, additives with good absorption of the laser beam with the respectively chosen wavelength are admixed with the organic materials.

17 Claims, No Drawings

METHOD FOR THE LASER MACHINING OF ORGANIC MATERIALS

BACKGROUND OF THE INVENTION

FIELD OF THE INVENTION

It is known from Published, European Patent Application EP 0 164 564 A to use an excimer laser to produce blind holes in a laminate with the layer sequence metal-dielectric-metal. The uppermost metal layer of the laminate is in this case used as an aperture mask, the pattern of holes of which is transferred by photolithography and is produced by subsequent etching. The dielectric exposed in the region of the apertures of the mask is then removed by the action of the excimer laser until the lowermost metal layer is reached and the removal process is ended. The known method is used in particular in the manufacture of multilayer printed-circuit boards for producing the required plated-through holes in the form of blind holes.

The German periodical titled "Feinwerktechnik & Messtechnik" 91 (1983) 2, pages 56–58, discloses a similar method of manufacturing multilayer printed-circuit boards, in which the blind holes serving as plated-through vias are produced with the aid of a $CO_2$ laser. Here, too, the uppermost copper foil serves as an aperture mask, with which the copper is etched away wherever the laser beam is intended to produce a hole.

Published, Non-Prosecuted German Patent Application DE 197 19 700 A also discloses devices for the laser drilling of laminates, in which a first laser with a wavelength in the range from approximately 266 nm to 1064 nm is used for drilling the metal layers and a second laser with a wavelength in the range from approximately 1064 nm to 10600 nm is used for drilling the dielectric layers. U.S. Pat. No. 5,593,606 discloses a method for the laser drilling of laminates in which a single UV laser, the wavelength of which lies below 400 nm and the pulse width of which lies below 100 ns, is used for drilling the metal layers and for drilling the dielectric layers. Precluding the use of an excimer laser, metal and organic material are consequently drilled with the same UV laser.

Published, Non-Prosecuted German Patent Application DE 198 24 225 discloses a further method for the laser drilling of laminates, in which for example a second harmonic generation (SHG) YAG laser with a wavelength of 532 nm or a third harmonic generation (THG) YAG laser with a wavelength of 355 nm can also be used for drilling the metal layers and for drilling the dielectric layers.

In principle, it can be stated that, in the laser drilling of organic materials with UV lasers, that is to say with wavelengths below 400 nm, a photochemical decomposition of the organic materials takes place. Consequently, no burning occurs and, on account of the extremely small or non-existent thermal loading, in the case of laminates no delamination occurs. By contrast with this, in the laser drilling of organic materials by $CO_2$ lasers, a thermal decomposition of the organic materials takes place, that is to say burning may occur and, in the case of laminates, there is the risk of delamination. In comparison with UV lasers, however, considerably shorter machining times can be achieved with $CO_2$ lasers in the drilling of organic materials.

Published, European Patent Application EP 0 478 313 A discloses the so-called surface laminar circuit (SLC) method, in which initially a first wiring level is produced on a base substrate. Then, a dielectric layer of a photosensitive epoxy resin is applied to the first wiring level by screen printing or by curtain coating. Then, blind holes are produced in the dielectric layer by photolithographic methods, by exposing and developing. After the chemical and electrolytic copperplating of the walls of the holes and the surface of the dielectric layer, the second wiring level is produced by structuring of the deposited copper layer. Further wiring levels can be produced in the way described by the alternating application of photosensitive dielectric layers and copper layers.

SUMMARY OF THE INVENTION

It is accordingly an object of the invention to provide a method for the laser machining of organic materials that overcomes the above-mentioned disadvantages of the prior art methods of this general type, which permits a high machining rate without thermally damaging the material in the laser machining of organic materials.

With the foregoing and other objects in view there is provided, in accordance with the invention, a method for laser machining organic materials. The method includes the steps of providing a laser outputting a laser beam having the following parameters:

wavelength: 300 nm to 1200 nm pulse width: <50 ns pulse frequency: >20 kHz; and admixing an organic material with additives having good absorption properties of the laser beam at a respectively chosen wavelength.

The term "laser machining" is understood for the purposes of the invention as meaning in particular the production of blind holes and through-holes. The method according to the invention may also be used, however, generally for the laser removal of organic materials, for example for the structuring of solder resists or for the structuring of electroplating resists or etching resists.

The invention is based on the finding that the admixing of suitable additives with the organic materials allows the degree of absorption for the laser radiation at the respectively chosen wavelength to be increased considerably. For the purposes of the invention, the additives are to have a significantly higher degree of absorption of the laser beams of the respective wavelength than the pure organic material. The higher absorption of the laser beams in the organic material then produces a considerable increase in the machining rate. However, the laser parameters specified, in particular, the short pulse widths also contribute to the high machining rates. It is to be seen as a further advantage that, with lasers in the wavelength range of between 300 nm and 1200 nm, metal layers of laminates can also be drilled. For the drilling of metal layers of this type, pulse frequencies above 30 kHz are then chosen.

A preferable wavelength of the laser is between 400 nm and 1100 nm. The narrower wavelength range specified is particularly well suited for the laser machining of those organic materials of which the degree of absorption is increased by the admixing of additives.

The frequency-doubled Nd-vanadate laser specified with a wavelength of 532 nm, permits very high pulse frequencies, which may even lie above 100 kHz, with low pulse widths of less than 40 ns. The high pulse frequencies in this case permit fast and effective machining of the organic materials, while very low thermal loading is ensured by the low pulse widths.

The Nd-vanadate laser specified with a wavelength of 1064 nm, also offers several advantages however. In particular, higher rates can be achieved with a laser of this type.

In accordance with an added mode of the invention, there is the step of setting the pulse frequency to be <50 kHz. The higher pulse frequencies permit even more effective machining of the organic materials.

The development permits even lower thermal loading of the organic materials, or if appropriate of the laminates, in the laser machining as a result of pulse widths of less than 30 ns.

Using a focused laser beam and with spot diameters of between 10 μm and 100 μm provides effective laser machining of the organic materials. Using spot diameters of between 20 μm and 50 μm allows the laser machining of the organic materials to be made even more effective.

A refinement permits a further increase in the machining rate as a result of the high linear velocity of the laser beam of more than 300 mm/s.

A development using at least one of an inorganic pigment, an organic pigment, a polymer-soluble dye and a fibrous filler as the additives permits a particularly simple and cost-effective increase in the degree of absorption of the organic material.

A refinement using at least one of an inorganic red pigment, an organic red pigment and a polymer-soluble red dye a s the additives if the laser has a wavelength of 532 nm permits an optimization of the degree of absorption by the selection of red additives, since the green light of the wavelength of 532 nm is absorbed particularly well by the complementary color red.

Using at least one of copper oxalate and copper hydroxyphosphate as the additives if the laser has the wavelength set at 1064 nm has proven to be particularly successful for a high absorption of invisible laser beams at the wavelength of 1064 nm.

Admixing between 0.1% by weight and 5.0% by weight of the additives with the organic material specifies a quantity range for the admixture of the additives which has proven to be particularly successful for increasing the degree of absorption without impairing the other properties. The narrower quantity range of admixing between 1% by weight and 2% by weight of the additives with the organic material is to be regarded as optimum in this respect.

If the degree of absorption of the organic material is increased to at least 50% by the admixture of additives, a considerable increase in the machining rate in the organic material is already obtained. With an increase in the degree of absorption to at least 60%, or to least 80%, the machining times for the laser machining of the organic material can be reduced correspondingly further.

Other features which are considered as characteristic for the invention are set forth in the appended claims.

Although the invention is described herein as embodied in a method for the laser machining of organic materials, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

Description of the Preferred Embodiments

In the examples described below, the following types of lasers were used.

Laser I

Diode-pumped, frequency-doubled Nd-vanadate laser from the company Spectra Physics, Mountain View, California, US.

Designation: T80-YHP40–532 QW

Wavelength: 532 nm

Power: approximately 8.5 W

Operating mode: monomode TEMoo

Pulse width: 20 ns at pulse frequency of 10 kHz

Pulse frequency: up to 200 kHz

Field size (optics): 100×100 mm$^2$

Laser II

Diode-pumped, frequency-doubled Nd-vanadate laser from the company Haas-Laser GmbH, Schramberg, DE.

Designation: none, since prototype

Wavelength: 532 nm

Power: approximately 4.0W

Operating mode: monomode TEMoo

Pulse width: 25 ns at pulse frequency of 10 kHz

Pulse frequency: up to 200 kHz

Field size (optics): 100×100 mm$^2$

Laser III

Diode-pumped Nd-vanadate laser from the company Spectra Physics, Mountain View, California, US.

Designation: T80-YHP40–106 QW

Wavelength: 1064 nm

Power: >18W at pulse frequency of 40 kHz

Operating mode: monomode TEMoo

Pulse width: 40 ns

Pulse frequency: up to 200 kHz

Field size (optics): 100×100 mm$^2$

The following materials were machined with the lasers I, II and III.

Material I

A dielectric layer with a thickness of 25 μm of unreinforced, modified epoxy material. Dielectric layers of this type are applied in the manufacture of multilayer wirings to the already finished wiring layers by curtain coating or by screen printing.

Material II

A resin coated copper (RCC) foil containing a 12 μm thick copper foil and a (after pressing) 60 μm thick dielectric layer of unreinforced, modified epoxy material. The RCC material is laminated onto one side or both sides of a core of a printed-circuit board together with a 12 μm thick copper foil (copper foil as an outer material).

Material III

FR4 material (FR4 =level 4 fire retardant epoxy-glass composition) with a thickness of 60 μm and a modified glass fiber reinforcement. The FR4 material is laminated onto one side or both sides of the core of a printed-circuit board together with a 12 μm thick copper foil (copper foil as outer material).

The following additives were available for modifying the materials I to III described above.

Additive I

An organic red pigment with the designation "1501 Fast Red" (C.I. Pigment Red 48:1) from the company Xijingming, Shenzhou City, Hebei Province, P.R. China. This is an azo-pigment based on a barium salt.

Additive II

Inorganic red pigment with the designation "Bayferrox" (C.I. Pigment Red 101) from Bayer AG, DE. This is an iron oxide red pigment.

Additive III

Copper oxalate

Additive IV

Copper hydroxy phosphate

Additive V

Polymer-soluble anthraquinone dye with the designation "Oracet™ Yellow GHS" (C.I. Solvent Yellow 163) from CIBA-Geigy AG, CH.

Additive VI

Fibers of a ruby glass prepared by adding 2% by weight of selenium and 1% by weight of cadmium sulfide, 1% by weight of arsenic trioxide and 0.5% by weight of carbon to a basic glass of the composition $NA2O-ZnO-4SiO2$.

EXAMPLE 1

In the manufacture of multilayer wirings, dielectric layers of an organic material are applied in a thickness of, for example, 25 µm to the already finished wiring layers by curtain coating or by screen printing. A modified epoxy material to which approximately 1.5% by weight of the additive I was admixed was used as the organic material. Then blind holes, later serving as plated-through vias to the next wiring layers, were made in these dielectric layers without the use of masks.

For making blind holes in the dielectric layers, the laser II was used. Using two galvanometer mirrors for deflecting the laser beam, surface areas of 10 cm ×10 cm can be machined. Further parameters of the laser are specified as follows:

Pulse width: 30 ns

Pulse frequency: 25 kHz.

With a spot diameter of the focused laser beam of approximately 25 µm, the blind holes were made in the dielectric layers at the predetermined locations. A pulse frequency of between 10 and 20 kHz was chosen for this. When making the blind holes, it was possible to avoid burning or other thermal damage. The admixing of the additive I allowed the rate of drilling the dielectric layers to be increased by a factor of between 2 and 2.5.

EXAMPLE 2

With the laser I, blind holes with a diameter of 125 µm were made in the modified epoxy material of the material II. The modification of the epoxy material took place by admixing approximately 1.5% by weight of the additive I. The pulse frequency was 24 kHz. The pulse width was 30 ns.

Using two galvanometer mirrors for deflecting the laser beam in the X direction and in the Y direction, a surface area of 10 cm ×10 cm was machined. For drilling the epoxy material, this beam was set 0.5 to 3 mm, preferably 1 to 1.5 mm, out of focus (OOF =Out Of Focus) and moved in concentric circles in the region of the hole. The linear velocity of the laser beam was 900 mm/s. After drilling through the epoxy material, the copper layer lying underneath was affected only slightly.

The drilling of the epoxy material took place at a rate of 550 holes per second. In comparison, pure epoxy material without additives can be drilled only at a rate of 220 holes per second.

EXAMPLE 3

As a departure from example 2, the laser II was used, with the same laser parameters. The drilling of the modified epoxy material took place at a rate of 305 holes per second.

EXAMPLE 4

As a departure from example 2, blind holes with a diameter of 100 µm were produced. The drilling of the modified epoxy material took place here at a rate of 955 holes per second.

EXAMPLE 5

As a departure from example 3, blind holes with a diameter of 100 µm were produced. The drilling of the modified epoxy material took place here at a rate of 530 holes per second.

EXAMPLE 6

As a departure from example 2, blind holes with a diameter of 75 µm were produced. The drilling of the modified epoxy material took place here at a rate of 2000 holes per second.

EXAMPLE 7

As a departure from example 3, blind holes with a diameter of 75 µm were produced. The drilling of the modified epoxy material took place here at a rate of 1000 holes per second.

EXAMPLE 8

As a departure from example 2, the modification of the epoxy material took place by admixing approximately 1.5% by weight of the additive II. The results were comparable.

EXAMPLE 9

As a departure from example 2, the modification of the epoxy material took place by admixing approximately 1.5% by weight of the additive V. The rate for the drilling of the pulse material was slightly lower here.

EXAMPLE 10

As a departure from example 2, the blind holes were made in the material III. The epoxy material of the material III was reinforced with approximately 50% by weight of fibers of the additive IV instead of the usual glass fiber reinforcement. The results were comparable.

EXAMPLE 11

As a departure from example 2, the laser III was used with a pulse frequency of 25 kHz and a pulse width of 30 ns.

Furthermore, here the modification of the epoxy material took place by admixing approximately 1.5% by weight of the additive III. The drilling of the epoxy material took place here at a rate of 1155 holes per second.

EXAMPLE 12

As a departure from example 11, the modification of the epoxy material took place by admixing approximately 1.5% by weight of the additive IV. It was possible for the rate for the drilling of the epoxy material to be increased slightly in comparison with example 11.

We claim:

1. A method for laser machining organic materials, which comprises the steps of:
   providing a laser outputting a laser beam having the following parameters:
   wavelength: 300 nm to 1200 nm
   pulse width: <50 ns
   pulse frequency: >20 kHz; and
   admixing an organic material with additives having good absorption properties of the laser beam at a respectively chosen wavelength.

2. The method according to claim 1, which comprises setting the wavelength of the laser to 400 nm to 1100 nm.

3. The method according to claim 1, which comprises using a frequency-doubled Nd-vanadate laser having the wavelength of 532 nm as the laser.

4. The method according to claim 1, which comprises using a Nd-vanadate laser having the wavelength of 1064 nm as the laser.

5. The method according to claim 1, which comprises setting the pulse frequency to be <50 kHz.

6. The method according to claim 1, which comprises setting the pulse width to be <30 ns.

7. The method according to claim 1, which comprises setting a spot diameter of the laser beam to be between 10 μm and 100 μm.

8. The method according to claim 1, which comprises setting a spot diameter of the laser beam to be between 20 μm and 50 μm is used 9. The method according to claim 1, which comprises moving the laser beam at a linear velocity of >300 mm/s.

10. The method according to claim 1, which comprises using at least one of an inorganic pigment, an organic pigment, a polymer-soluble dye and a fibrous filler as the additives.

11. The method according to claim 10, which comprises using at least one of an inorganic red pigment, an organic red pigment and a polymer-soluble red dye as the additives if the using the laser has the wavelength set at 532 nm.

12. The method according to claim 10, which comprises using at least one of copper oxalate and copper hydroxyphosphate as the additives if the laser has the wavelength set at 1064 nm.

13. The method according to claim 10, which comprises admixing between 0.1% by weight and 5.0% by weight of the additives with the organic material.

14. The method according to claim 10, which comprises admixing between 1% by weight and 2% by weight of the additives with the organic material.

15. The method according to claim 10, wherein the organic material has as a result of the admixing of the additives a degree of absorption of at least 50% for the respective wavelength of laser radiation.

16. The method according to claim 10, wherein the organic material has as a result of the admixing of the additives a degree of absorption of at least 60% for the respective wavelength of laser radiation.

17. The method according to claim 10, wherein the organic material has as a result of the admixing of the additives a degree of absorption of at least 80% for the respective wavelength of laser radiation.

* * * * *